Dec. 1, 1959 M. H. SWEET 2,915,705

ELECTRICAL CHARGE TRANSFER SYSTEM

Filed Oct. 27, 1953 2 Sheets-Sheet 1

INVENTOR
MONROE H. SWEET
BY [signature]
[signature]
ATTORNEY

ELECTRICAL CHARGE TRANSFER SYSTEM

Filed Oct. 27, 1953 2 Sheets-Sheet 2

INVENTOR
MONROE H. SWEET
BY
ATTORNEY 2,915,705
Patented Dec. 1, 1959

2,915,705

ELECTRICAL CHARGE TRANSFER SYSTEM

Monroe H. Sweet, Binghamton, N.Y., assignor to General Aniline & Film Corporation, New York, N.Y., a corporation of Delaware Application October 27, 1953, Serial No. 388,549

5 Claims. (Cl. 324—111)

This invention relates to electronic systems and more particularly to circuits for transferring electrical charges from one electric storage element to another.

In various applications in the electronic art, it is advantageous to store electrical charges or quantities of electricity in a storage element such as a condenser and utilize these charges as unit quantities in reference to certain conditions existing, or indicative of changes occurring, in a system.

For example, in analogue computers or memory circuits, a voltage of given magnitude may be held in the form of a potential difference existing between terminals of a condenser for appreciable time and thereafter the charge transferred to another condenser. It may also often be necessary to transfer charges accumulated in various condensers to a single condenser to be held there as a reference potential or to be measured for quantitative determination.

It is the primary object of this invention to provide a circuit which effects the transfer of the charge from one condenser to another.

Another object of this invention is to provide a circuit which will measure the time integral of the current in a phototube circuit.

It is a particular feature of the invention that the circuit requires relatively few component elements and is stable in operation.

Another feature of the invention is that the circuit, with slight modifications, may easily be adapted for various applications in electronic systems such as to provide time delay, voltage holding or to function as an electronic memory device.

Other objects and features will be apparent from the following description of the invention, pointed out in particularity in the appended claims, and taken in connection with the accompanying drawings in which:

Figure 1:
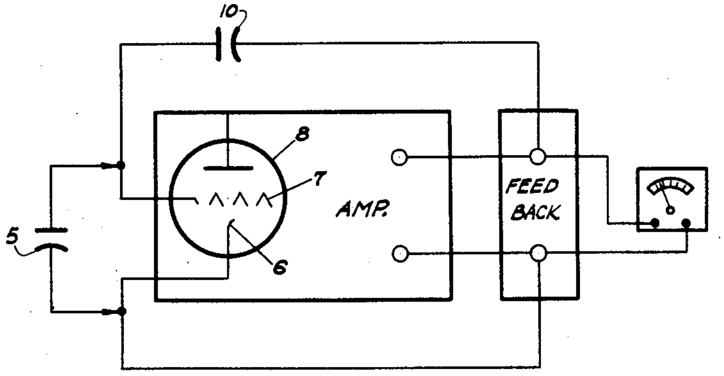
Fig. 1 is a block diagram illustrating the elemental component assembly.

Referring to the figures, the block diagram in Fig. 1 represents an amplifier with a feed-back network properly phased so as to give an inverse feedback from the output circuit of the amplifier back to the input circuit. Amplifiers of this type are well known in the art and may be constructed to have a substantial amount of feedback so that the total amplification or gain of the amplifier will be unity.

In accordance with the present invention, an amplifier of this type is employed and, in particular, one which is direct coupled so that it will respond to zero frequency, namely, a D.C. potential applied to the input circuit thereof. The capacitor or condenser 5, from which it is desired to transfer the electric charge, is connected into the input circuit of the amplifier between cathode 6 and grid 7 of the input vacuum tube 8. The capacitor 10 to which the charge of the capacitor 5 is to be transferred is in a series circuit arrangement with the latter and in the feed-back loop of the amplifier.

The charge or quantity of electricity of a condenser depends on the size or capacitance and the potential difference, e.g. $Q=CE$. Therefore, any increase or decrease in the charge of a condenser is exhibited by a proportional change in the potential across its terminals. Consequently, in accordance with this invention, the potential difference existing between terminals of a condenser is sensed by suitable electronic means such as a vacuum tube amplifier and this, in turn, controls appropriate means such as an inverse feedback circuit producing a current flow in a current conductive path in which another condenser is in series and this current flows in the direction of discharge of the first condenser. The current flow in effect is the displacement current of the first condenser which is being discharged while the other condenser is charged by the same current. The sensing means is responsive to the polarity and magnitude of the voltage between terminals of the first condenser. Therefore, the current flow automatically ceases when this terminal voltage becomes zero, which is the case when the condenser is fully discharged.

Figure 2:
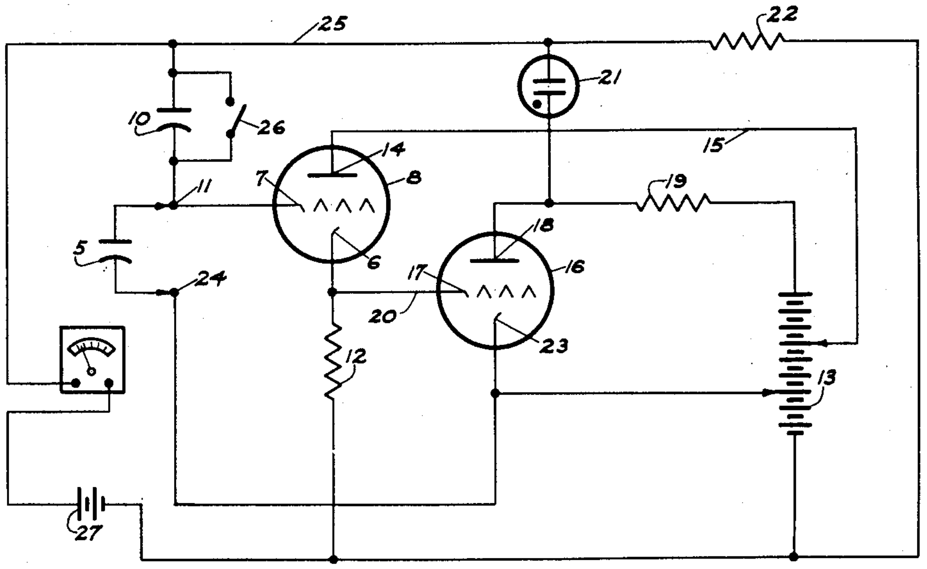
Fig. 2 shows a simplifed schematic circuit of the component elements.

Referring to Fig. 2, a simplified circuit diagram illustrates a two stage direct coupled vacuum tube amplifier having an input tube 8 of which the cathode 6 has a load resistance 12 which returns to the negative terminal of the power supply, represented here, by way of example, by the battery 13. The anode 14 of the tube 8 is connected to a suitable tap of the battery 13 by the lead 15. It is seen that the input stage of the amplifier is a cathode follower which is direct coupled to a second amplifying stage comprising the vacuum tube 16 by means of the lead 20 between cathode 6 and grid electrode 17. The anode 18 of the vacuum tube 16 returns to the highest positive terminal of the battery 13 through a suitable load resistance 19. A branch circuit from the anode 18 is provided through the gaseous discharge tube 21 and resistor 22 to the negative side of the battery 13. The cathode 23 of the tube 16 returns to a suitable tap of the battery 13 in order to provide negative bias for the grid 17 through the load resistance 12 and also neutralize the voltage drop thereacross by the static anode current of tube 8.

The input circuit for the tube 8, between grid 7 connected to input terminal 11 and cathode 6, includes the load resistance 12, the portion of the battery 13 to which the cathode 23 is connected and the second input terminal 24. The feed-back loop from the output of the tube 16 is taken from the junction point of the gaseous discharge tube 21 and resistor 22, by the lead 25 to the grid 7 including in series the condenser 10. A switch 26 is provided in shunt with the condenser 10 so as to short circuit the latter when desired. The condenser 5, which is to be discharged, is placed, as indicated by the arrows, between terminals 11 and 24 which represent the input to the amplifier. As seen in Fig. 2, condensers 5 and 10 are in series in a low impedance current conductive path which includes the lead 25, the resistor 22, and a portion of the battery 13 which connects with a second input terminal 24. A parallel conductive path through the discharge tube 21, resistor 19 and the supply source is of no consequence due to the static current condition of the discharge tube, as will be explained later.

It is to be understood that this condenser has a certain charge which is to be transferred to the condenser 10. How the condenser 5 received this charge is immaterial as far as the invention is concerned. It may have been in an electrical circuit where the charge represented a certain variable with reference to time or it may represent energy obtained from nuclear radiation, etc. Several condensers may be placed in succession in the charge transfer circuit having various charges and polarities and the total charge of these transferred on the condenser 10 in the system. In other words, depending upon the polarity of the charge, represented by a terminal voltage of the condenser 5, the condenser 10 in succession will acquire the total charge of the condensers connected between terminals 11 and 24. At one polarity of the charge of condenser 5 the charge transfer to condenser 10 will be greater than before whereas in the reverse polarity the charge of the condenser 10 will be less than before. The charge, as will be seen, depends upon the direction of current flow in the feedback loop and the current may either add to or subtract a charge from the condenser 10.

A voltmeter is connected across the resistor 22 in series with a voltage source, shown by the battery 27, for counteracting the steady state voltage drop appearing across the resistor 22. In this manner, only the change in the voltage drop across the resistor 22 due to the feedback current is indicated by the meter.

Figure 3:
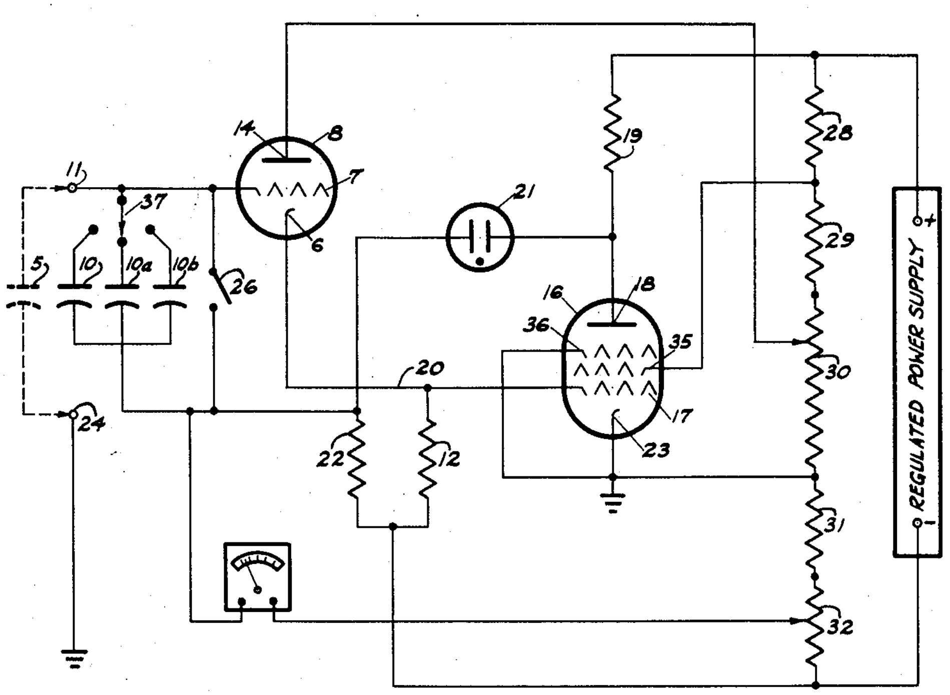
Fig. 3 is a circuit diagram of a practical form which may be used for diverse applications.

Referring to Fig. 3, the schematic circuit diagram represents a practical embodiment of the charge transfer system, the voltage source being replaced by a regulated power supply, shown in block diagram, which may comprise any of the well known forms of rectified power supplies deriving energy from an alternating current power line. The various operating voltages are taken from a voltage divider across the power supply comprising resistors 28, 29, 30, 31 and 32 connected in series. The second stage utilizes a pentode type vacuum tube to obtain the required feedback for substantially unity amplification. The screen 33 of the vacuum tube 8 is connected to the junction point by the resistors 28 and 29 and the suppressor grid 36 is connected to the cathode 23 in the conventional manner.

In place of a single condenser 10, a group of condensers such as 10, **10*a* and 10*b* is provided to be selectively connected into the circuit by means of the tap switch 37. The condensers in the group may have different values as to capacitance. For example, 10*a* may be ten times the value of 10 and 10*b* ten times the value of 10*a***, etc. or other suitable ratios may be provided depending upon the particular use for which the system is designed. The sensitivity of the system is higher with the decrease in the capacity of the condenser.

The indicating voltmeter is connected, as before, effectively across the feed-back current carrying resistor 22 and the bucking voltage is obtained from a variable tap on the resistor 32.

The intended operation of the circuit shown requires that grid leakage in the input tube be at a minimum, otherwise the capacitor selected from the group would discharge through the tube. The cathode follower input stage greatly minimizes the tendency of grid current flow and permits the use of conventional high m$\mu$ triodes for the input tube such as the type 6F5 instead of the more costly electrometer type tubes such as the FP-54. The variable adjustment of the anode voltage of tube 8 permits the selection of an operating point where the grid current is virtually zero for all practical purposes.

When the circuit is to be used for charge transfer the switch 26 is closed so that any residual charge on the condensers 10, **10*a* or 10*b* is removed. When the switch 26 is opened the particular condenser connected into the circuit by the switch 37 will float inasmuch as the circuit stability tends to maintain the grid 7 at the potential of the cathode 6 due to high inverse feedback. Now, if a charged condenser is connected between the terminals 11 and 24, as shown by the condenser 5 in dotted line, the voltage impressed on the grid 7 produces a current flow in the cathode load resistor 12 which is immediately counteracted by the feed-back voltage developed across the resistor 22 due to a change in the voltage drop across the anode load resistor 19 resulting from a change in anode current of the tube 16. Since this voltage drop causes a current flow in the feed-back loop which must pass through one of the condensers 10, 10*a* or 10*b*, whichever is in the circuit, and also through the condenser between terminals 11 and 24, a charge transfer takes place. This transfer continues until the voltage between these terminals is reduced to zero at which time the condenser is discharged. The charge so transferred on the particular condenser 10, 10*a* or 10*b* of the group is held for an appreciable time inasmuch as there is no discharge path except whatever leakage may exist in the grid circuit of the tube 8 or within the dielectric material of the condenser. The reason for this is that any tendency of discharge through the circuit is in effect a signal input for the tube 8** which the feedback tends to restore so as to maintain an equilibrium condition.

The charge upon the particular condenser 10 represents a voltage between terminals and the feed-back voltage must necessarily equal this voltage since the amplifier has an overall amplification of substantially unity. The circuit constants are so chosen that the voltage drop produced across the resistor 22 due to static current flow through the discharge tube 21 produces the feed-back voltage required for zero gain in the amplifier. Accordingly, an indication of this voltage by a suitable high resistance voltmeter may be correlated with the charge transferred so that the meter reading is in terms of charge rather than voltage. This can be chosen for a particular condenser value and the reading of the meter must be multiplied by a factor for other values of condensers placed into the circuit.

Figure 4:
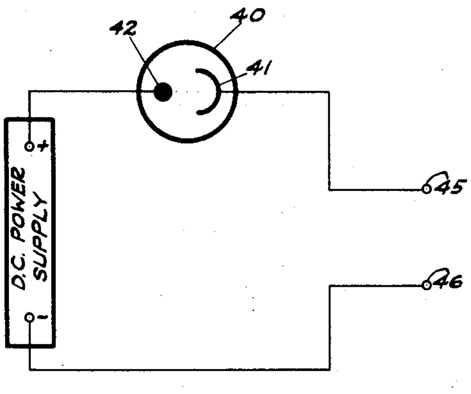
Fig. 4 is a circuit diagram illustrating a phototube device which may form an accessory attachment for measuring the time integral of the phototube current.

Referring to Fig. 4, there is shown in simplified manner, a phototube circuit which may also be used in connection with the charge transfer system so as to measure the time integral of the phototube current. This is particularly advantageous in various photometric work, for example to determine the sensitivity of photometric materials, exposure, intensity, etc. The phototube circuit consists of a phototube 40 having cathode 41 and anode 42 connected in series between the positive terminal of the power supply and the output terminal 45, respectively. The negative terminal of the power supply connects to the output terminal 46. The operation of the phototube circuit is well known in the art. Light falling on the cathode 41 liberates electrons which provide a conductive path to the anode 42 for current from the power supply when the circuit between terminals 45 and 46 is closed. This current is in direct proportion to the light intensity falling on the cathode 41.

When terminals 45 and 46 of the phototube circuit are interconnected with terminals 11 and 24 of the charge transfer circuit shown in Fig. 3, the phototube current due to light excitation of the phototube produces a signal voltage in the input circuit of the tube 8.

By virtue of the inverse feedback, a voltage of the same magnitude in the opposite phase is impressed upon the grid 7 and the feed-back current charges the particular condenser selected by the switch 37. As long as there is phototube current the selected condenser continues to build up an electric charge inasmuch as the amplifier continues to produce feed-back current through the resistor 22 and this current flows through the condenser. It is seen, therefore, that input excitation of the amplifier by a steady D.C. potential of fixed value will charge one of the condensers 10, **10*a* or 10*b* whichever is connected by the switch 37 to the grid 7, at a rate determined by the capacity of the selected condenser and the resistance of the input circuit between terminals 11 and 24, the resistance of the feed-back circuit being negligible. This charging action would continue indefinitely except for the limitations imposed by the circuit constants, vacuum tubes and the power supply. Saturation of the system will be reached when the power supply voltage is insufficient to permit further amplification by the vacuum tube 16** and consequently there is no further change in the feed-back current.

From the above it is seen that the phototube current is integrated by the condenser selected from the group 10, the charge of which, in terms of the voltage thereacross, is proportional to the time integral of the phototube current. The charge transfer circuit permits accurate and simple evaluation of this time integral by indicating the voltage appearing across the condenser without at the same time discharging it upon cessation of the phototube current. For example, at zero input excitation of the amplifier, the condenser charge remains for an appreciable time so that it may be held for other eventual addition or subtraction of charges.

In a practical embodiment for evaluating exposure of photographic materials to X-rays or other radiation, the following circuit constants have proved effective.

| | Ohms |
|---|---|
| Resistor **12** | 470,000 |
| Resistor **19** | 20,000 |
| Resistor **22** | 12,000 |
| Resistor **28** | 6,000 |
| Resistor **29** | 1,000 |
| Resistor **30** | 9,000 |
| Resistor **31** | 200 |
| Resistor **32** | 1,200 |

| | Mf. |
|---|---|
| Condenser **10** | .03 |
| Condenser **10*a*** | .3 |
| Condenser **10*b*** | 3 |

Power supply voltage=300 v.

Tube complement:

| | |
|---|---|
| Tube **8** | Type 6F5 |
| Tube **16** | 6AC7 |
| Tube **21** | VR150 |

Indicating meter=0–.50 microampere.

I claim:

1. In an electric charge transfer system, a pair of storage elements each adapted to accumulate an electric charge which results in a potential difference between terminals thereof, means for transferring substantially the total electric charge from one of said elements to the other and maintaining said transferred charge comprising an electronic circuit, including means connected between terminals of one of said elements for sensing the potential difference thereacross, a current conductive path including, in series, said storage elements, means operable upon response of said sensing means for initiating and sustaining current flow in said path in the direction of discharge of one of said storage elements until the potential between terminals of one of said storage elements falls to zero.

2. In an electric charge transfer system, a first condenser and a second condenser each adapted to accumulate an electric charge resulting in a potential difference between terminals thereof, circuit means for transferring the electric charge from said first condenser to said second condenser comprising means connected between terminals of said first condenser for sensing the potential difference thereacross, a closed circuit forming a current conductive path including in series said condensers and an impedance, means responsive to said sensing means for initiating and sustaining current flow in said impedance in the direction of discharge of said first condenser until the potential difference thereacross falls to zero and a measuring device connected to said impedance indicating the potential drop thereacross in terms of charge of said second condenser.

3. In an electric charge transfer system a first condenser having an electric charge, a second condenser to which said charge is to be transferred, a closed circuit forming a current conductive path including in series said condensers, a D.C. amplifier having an input circuit connected to said first condenser, said input circuit being of substantially infinite impedance and an output circuit, an inverse feed-back network including an impedance element between said input circuit and output circuit for producing in said amplifier an overall amplification of substantially unity, said impedance element being in series in said current conductive path whereby input excitation of said amplifier in proportion to the terminal voltage of said first condenser produces a feed-back current in said path causing displacement current flow in said condensers in the direction of discharge of said first condenser until the terminal voltage thereof becomes zero.

4. In an electric charge transfer system, a first condenser having an electric charge, a second condenser to which said charge is to be transferred, a closed circuit forming a current conductive path including in series said condensers, a vacuum tube amplifier comprising a cathode follower first stage having an input circuit connected to said first condenser, said input circuit being of substantially infinite impedance, a second stage directly coupled thereto, an inverse feed-back circuit from the output of said second stage to the input of said first stage including a resistance, said feed-back circuit reducing the overall amplification of said amplifier to substantially unity, said resistance being in series in said current conductive path whereby input excitation of said amplifier in proportion to the terminal voltage of said first condenser produces a voltage drop across said resistance causing a current flow in said path and displacement current flow in said condensers in the direction of discharge of said first condenser until the terminal voltage thereof becomes zero.

5. In an electric charge transfer system a first condenser having an electric charge, a second condenser to which said charge is to be transferred, a closed circuit forming a current conductive path including in series said condensers, a vacuum tube amplifier comprising a cathode follower first stage having an input circuit connected to said charged condenser, said input circuit being of substantially infinite impedance, a second stage directly coupled thereto, an inverse feed-back circuit from the output of said second stage to the input of said first stage including a resistance, said feed-back circuit reducing the overall amplification of said amplifier to substantially unity, said resistance being in series in said current conductive path whereby input excitation of said amplifier in proportion to the terminal voltage of said first condenser produces a voltage drop across said resistance causing a current flow in said path and displacement current flow in said condensers in the direction of discharge of said first condenser until the terminal voltage thereof becomes zero, and a voltmeter connected effectively in shunt to said resistance indicating the voltage drop thereacross in terms of the electric charge transferred to said second condenser.

References Cited in the file of this patent

UNITED STATES PATENTS

| | | |
|---|---|---|
| 2,483,410 | Grieg et al. | Oct. 4, 1949 |
| 2,567,276 | Dicke | Sept. 11, 1951 |
| 2,607,528 | McWhirter et al. | Aug. 19, 1952 |
| 2,615,934 | Mackta | Oct. 28, 1952 |
| 2,713,135 | Macklem | July 12, 1955 |
| 2,741,756 | Stocker | Apr. 10, 1956 |